May 31, 1966 F. K. H. NALLINGER 3,253,581
ROTARY PISTON ENGINE
Filed July 23, 1962

INVENTOR.
FRIEDRICH K. H. NALLINGER
BY Dicke + Craig
ATTORNEYS

United States Patent Office 3,253,581
Patented May 31, 1966

3,253,581
ROTARY PISTON ENGINE
Friedrich K. H. Nallinger, Stuttgart, Germany, assignor to Daimler-Benz Aktiengesellschaft, Stuttgart-Unterturkheim, Germany
Filed July 23, 1962, Ser. No. 211,720
5 Claims. (Cl. 123—8)

The present invention relates to a rotary piston internal combustion engine of trochoidal construction having a polygonal piston which is provided at each corner thereof with a sealing structure extending in the axial direction of the piston and providing a seal in the radial direction with respect to the cam track of the piston within the housing of the internal combustion engine, and which is composed of several parts.

It has been noted in actual operation of internal combustion engines of the type described herein above that sealing structures made in a single integral part do not provide a satisfactory seal if the cam track of the piston within the housing is provided with arched or curved surfaces as a result of thermal expansions and/or also of wear appearances which the rectilinear sealing edge of the sealing structure is no longer able to follow. Sealing structures consisting of several parts also fail to provide any effective remedy if the individual bar- or vane-like sealing portions thereof are constructed in such a manner that they mutually influence each other during the movements thereof, for example, in such a manner that the radial outward movement of a center sealing part is utilized to press sealing parts providing a seal with respect to the housing side walls against the housing side walls.

By the use of the present invention which essentially consists in that each sealing structure is composed of at least three sealing parts in the form of vane- or bar-like sealing elements disposed one behind the other in the axial direction which do not mutually influence each other during movements thereof in the radial direction, it is possible to considerably improve the sealing effect with respect to the prior art construction since each individual sealing part may move separately and individually outwardly in the radial direction until it abuts against the cam track or cam surface coordinated thereto and adapts itself to the shape of the corresponding cam track portion. The arrangement of three sealing parts is thereby normally to be considered as adequate. A center sealing part may thereby follow, for example, the most strongly arched portion of the cam track whereas the two lateral sealing parts may be coordinated to or associated with the portions of the cam surface or cam track which adjoin the housing side walls and which extend toward the arched center portion with more or less of an incline.

If two sealing structures disposed one behind the other in the circumferential direction of the piston are provided at each piston corner, then the arrangement in accordance with the present invention may be advantageously made in such a manner that the second sealing structure consists of at least two bar-like sealing parts disposed one behind the other in the axial direction of the piston and the joints or gaps between the sealing parts of the one sealing structure are offset to the gaps or joints between the bar-like sealing parts of the other sealing structure. It is possible thereby not only to seal the gaps or joints between the sealing parts, but additionally an improved seal is obtained with respect to the cam track or cam surface within the housing.

Accordingly, it is an object of the present invention to provide a sealing structure for rotary piston internal combustion engines of the type mentioned hereinabove which avoids, by simple means and in an effective manner, the shortcomings and inadequacies encountered with the prior art constructions.

It is another object of the present invention to provide a sealing structure for rotary piston internal combustion engines which assures satisfactory seals for the corners of the pistons notwithstanding thermal expansions and/or wear on the part of the cam track for the piston within the housing of the engine.

Still another object of the present invention resides in the provision of a bar-like sealing structure composed of several parts for rotary piston internal combustion engines whereby the parts are so arranged and constructed as to avoid any mutual influence on each other during adaptation thereof to the cam track portions associated with the individual parts.

A still further object of the present invention resides in the provision of a sealing structure for rotary pistons of the type mentioned hereinabove which considerably improves the sealing effect obtainable therewith as compared to the prior art arrangements.

Still another object of the present invention resides in the provision of a sealing structure made of several individual parts which is so constructed and arranged as to effectively provide also a seal for the joints between the individual sealing ledge parts.

These and other objects, features and advantages of the present invention will become more obvious from the following description when taken in connection with the accompanying drawing which shows, for purposes of illustration only, one embodiment in accordance with the present invention, and wherein FIGURE 1 is a somewhat schematic, partial cross sectional view through the housing of a rotary piston internal combustion engine with a side view on a corner of the piston thereof;

Figure 1:
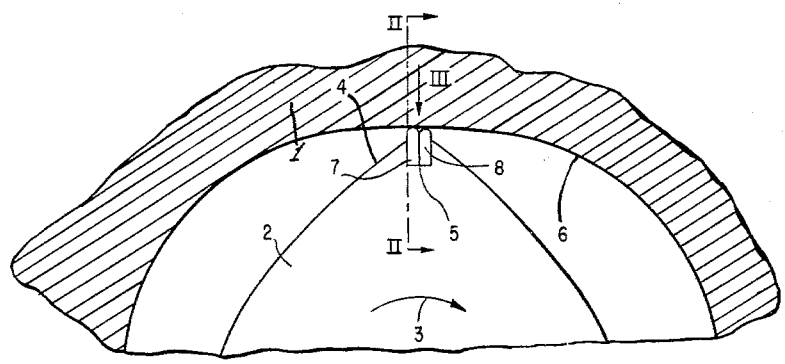

Referring now to the drawing wherein like reference numerals are used throughout the various views to designate like parts, and more particularly to FIGURE 1, reference numeral 1 designates therein the housing of a rotary piston internal combustion engine of any suitable construction, such as shown, for example, in U.S. Patent 2,880,045 to Wankel and not illustrated herein in further detail. A polygonal piston 2 is rotatingly arranged within the housing 1 to rotate in the direction of arrow 3. Each corner 4 of the piston 2 is provided with a channel or groove 5 extending in the axial direction of the piston 2 in which are arranged vane- or bar-like sealing elements 7 and 8 which provide a seal in the radial direction against the cam track or surface 6 of the piston 2 within the housing 1.

Figure 2:
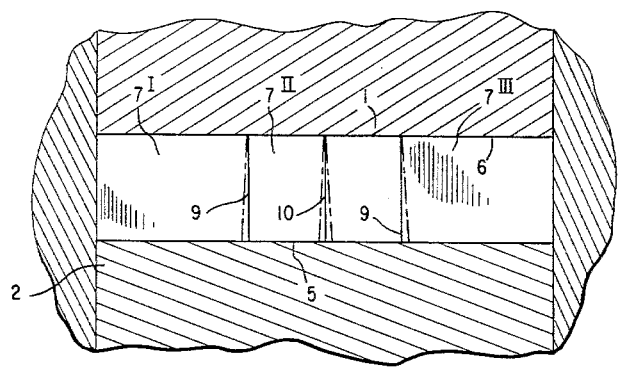
FIGURE 2 is a cross sectional view, on an enlarged scale, taken along line II—II of FIGURE 1.
Figure 3:
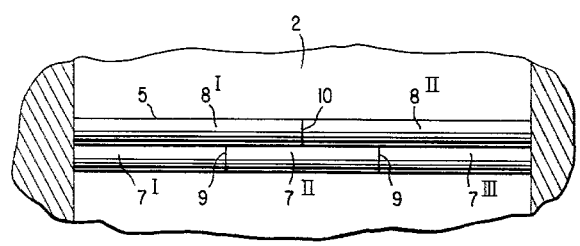
FIGURE 3 is a top plan view of the piston corner of FIGURE 2, taken in the direction of arrow III of FIGURE 1.
Figure 4:
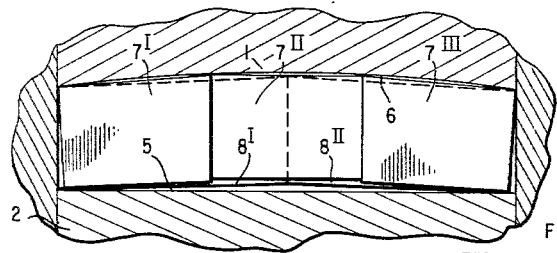
FIGURE 4 is a cross sectional view similar to FIGURE 2 and showing the position of the vane- or bar-like sealing parts in accordance with the present invention with an arched housing cam track or cam surface.

As will appear more fully from FIGURES 2 and 3, the sealing structure 7 consists of the three sealing parts $7^I$, $7^{II}$ and $7^{III}$ disposed one behind the other in the axial direction of the piston 2, whereas the sealing structure 8 is constituted by the two sealing parts $8^I$ and $8^{II}$ which are also disposed one behind the other in the axial direction of the piston 2. The separating joints or gaps 9 between the sealing parts $7^I$ and $7^{II}$, on the one hand, and between the sealing parts $7^{II}$ and $7^{III}$, on the other, are disposed offset, by the particular subdivision of the parts, with respect to the separating joint or gap 10 between the sealing parts $8^I$ and $8^{II}$. In order that the sealing parts may also adapt themselves to a relatively strongly arched or curved cam track 6 without mutually influencing and disturbing each other (illustrated in an exaggerated manner in FIGURE 4), the separating gaps or joints between the bar-like sealing parts, as indicated in dot and dash line in FIGURE 2 may be made wider at the bottom of the groove 5 than at the upper end thereof.

Each of the bar- or vane-like sealing parts of sealing structures 7 and 8 may move independently of the other sealing parts thereof either outwardly or inwardly in the radial direction. To the extent that the gas pressure within the internal combustion engine and/or the centrifugal force alone are not utilized for purposes of pressing the sealing structures against a side wall of the groove 5 and of pressing the sealing structures from the groove bottom against the cam track 6, appropriate conventional springs may also be utilized for this purpose. Possibly for purposes of adaptation to relatively strongly arched or curved cam tracks, the sealing structures 7 and 8 may also be made of smaller dimensions in the axial direction of the piston 2 than the corresponding dimensions of the piston itself so that with the existence of a small play a slight canting of the ledge parts is possible.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. In a rotary mechanism having housing means providing an internal circumferential cam surface and piston means adapted to rotate along said surface, a sealing arrangement for said piston means comprising sealing means extending in the axial direction of the piston means to provide a seal in the radial direction with respect to said cam surface, said sealing means consisting of at least three completely separate sealing parts disposed one behind the other in the axial direction of the piston in non-overlapping relationship to form separating joints therebetween and operable without mutually influencing one another during movements thereof in the radial direction, each sealing part being of larger dimension in the axial direction thereof at the radially outer ends thereof than at the radially inner ends thereof so that the separating joints between adjacent sealing parts increase in the direction toward the axis of said piston means, and said sealing means being slightly shorter in the axial direction of said piston means than the axial dimension of said piston means to enable a slight canting of the sealing parts due to the resulting small play and therewith enable an improved adaptation to a relatively strongly curved cam surface.

2. A rotary mechanism, especially rotary piston internal combustion engine of trochroidal construction, comprising housing means providing a cam surface, polygonal piston means adapted to rotate within said housing means and provided at each corner thereof with sealing means extending in the axial direction of the piston means to provide a seal in the radial direction with respect to said cam surface, said sealing means including two sealing structures disposed one behind the other in the circumferential direction of the piston, one of said sealing structures consisting of at least three separate sealing parts disposed one behind the other in the axial direction of the piston means in non-overlapping relationship to form therebetween separating joints and the other sealing structure consisting of at least two separate sealing parts disposed one behind the other in the axial direction in non-overlapping relationship to form therebetween separating joints, the joints between the two sealing parts of said second-mentioned sealing structure being arranged offset with respect to the joints of the sealing parts of said first-mentioned sealing structure, and the parts of each sealing structure of said sealing means being operable to move in the radial directions substantially without mutually influencing each other, each sealing part being of larger dimension in the axial direction thereof at the radially outer ends than at the radially inner ends thereof so that the separating joints between sealing parts adjacent to each other in said axial direction are larger nearer the axis of said piston means, and said sealing structures being of smaller dimension than said piston means in the axial direction thereof to enable improved adaptation of the parts to a relatively strongly curved cam surface.

3. In a rotary piston mechanism having housing means providing a cam surface and piston means adapted to rotate along said cam surface, a sealing arrangement in said piston means comprising sealing means extending in the axial direction of the piston means to provide a seal in the radial direction with respect to said cam surface, said sealing means consisting of at least three completely separate sealing parts disposed one behind the other in the axial direction of the piston means in non-overlapping relationship to form therebetween separating gaps and operable to provide a radial seal without mutually influencing one another during movements thereof in the radial direction, each sealing part being of larger dimension in the axial direction thereof at the radially outer end than at the radially inner end thereof so as to provide separating gaps therebetween which increase in the radially inward direction.

4. In a rotary piston mechanism having housing means including spaced lateral walls spaced at a predetermined distance from each other in the axial direction of the mechanism, a combination according to claim 3, wherein the total length of the sealing parts in the axial direction during axial abutment with each other is less than said predetermined distance.

5. The combination according to claim 4, wherein said sealing means further includes two completely separate sealing parts disposed one behind the other in the axial direction of the piston means in non-overlapping relationship to form therebetween sealing gaps, said two completely separate sealing parts being disposed in said piston means adjacent to said three sealing parts in the circumferential direction of the piston means, the sealing gaps of said two last-mentioned sealing parts being offset with respect to the sealing gaps of said three first-mentioned sealing parts, and the sealing gaps of said last-mentioned two sealing parts also increasing in the radially inward direction.

References Cited by the Examiner

UNITED STATES PATENTS

| | | | |
|---|---|---|---|
| 280,710 | 7/1883 | Baker | 123—8 |
| 1,358,176 | 11/1920 | Rolaff | 230—152 |
| 1,799,294 | 4/1931 | Gough | 123—8 |
| 2,345,561 | 4/1944 | Allen | 123—8 |
| 2,355,772 | 8/1944 | Zahodiakin | 277—192 X |
| 2,880,045 | 3/1959 | Wankel | 123—8 |
| 3,053,543 | 9/1962 | Kallin | 277—154 |
| 3,130,900 | 4/1964 | Schlor. | |
| 3,175,503 | 3/1965 | Peras | 103—130 |

FOREIGN PATENTS 551,263   1/1923   France.

SAMUEL LEVINE, *Primary Examiner.*

JOSEPH H. BRANSON, Jr., KARL J. ALBRECHT,
*Examiners.*

F. T. SADLER, *Assistant Examiner.*